United States Patent
Bossert et al.

(10) Patent No.: US 7,826,513 B2
(45) Date of Patent: Nov. 2, 2010

(54) RE-ENTRANT STRUCTURE FOR THIN DISK RESONATORS

(75) Inventors: David J. Bossert, Albuquerque, NM (US); Dennis R. Rossbach, Corrales, NM (US)

(73) Assignee: The Boeing Company, Chicago, IL (US)

( * ) Notice: Subject to any disclaimer, the term of this patent is extended or adjusted under 35 U.S.C. 154(b) by 76 days.

(21) Appl. No.: 11/847,876

(22) Filed: Aug. 30, 2007

(65) Prior Publication Data

US 2009/0059991 A1   Mar. 5, 2009

(51) Int. Cl.
*H01S 3/08* (2006.01)
*H01S 3/09* (2006.01)

(52) U.S. Cl. .............................. 372/93; 372/70; 372/92

(58) Field of Classification Search .................... 372/92, 372/93, 69–70, 98, 99
See application file for complete search history.

(56) References Cited

U.S. PATENT DOCUMENTS

| | | | | |
|---|---|---|---|---|
| 5,113,408 A | * | 5/1992 | Bihler | 372/93 |
| 5,553,088 A | * | 9/1996 | Brauch et al. | 372/34 |
| 5,757,839 A | * | 5/1998 | Biswal et al. | 372/72 |
| 6,542,524 B2 | * | 4/2003 | Miyake | 372/23 |
| 6,765,947 B2 | | 7/2004 | Kumkar | |
| 6,778,580 B2 | | 8/2004 | Erhard et al. | |
| 6,834,064 B1 | * | 12/2004 | Paschotta et al. | 372/30 |
| 7,463,667 B2 | * | 12/2008 | Vetrovec et al. | 372/99 |

* cited by examiner

*Primary Examiner*—Minsun Harvey
*Assistant Examiner*—Phillip Nguyen
(74) *Attorney, Agent, or Firm*—Sawyer Law Group, P.C.

(57) ABSTRACT

The present embodiment provides a system and method for lowering the saturated gain level of a thin-disk laser oscillator by multipassing each gain generator in such a way to cancel some of the wavefront error contributions from the disk surfaces. Wavefront aberrations introduced on one pass of the gain disk are canceled through symmetry on successive passes. The reduced wavefront error significantly improves design space for single-mode resonators. Maximum effectiveness is achieved by rotating the gain disk so that the fold plane-of-symmetry reverses the largest wavefront error or specifically chosen functional forms.

40 Claims, 10 Drawing Sheets

RE-ENTRANT STRUCTURE FOR THIN DISK RESONATORS

FIELD OF THE INVENTION

The present embodiment relates generally to solid-state lasers, and more particularly, to an intra-cavity reflector assembly having a plurality of dielectric reflecting mirrors.

BACKGROUND OF THE INVENTION

Solid-state lasers employing a thin disk of lasing material have been demonstrated at power levels of a few kW in multimode optical beams. A thin disk laser is recognized to be a unique kind of diode-pumped, high power solid-state laser, differing from conventional rod or slab lasers in its gain medium geometry. The thin (~100 μm) disk dimension of the active medium enables large optical pumping densities, efficient extraction, and importantly, minimal thermo-optical distortion of optical beams in the crystal. The geometry of the thin disk provides a large ratio of cooling surface to heat-producing volume, while providing a nearly one-dimensional heat flow that is collinear to the lasing beam axis. The latter minimizes thermal lensing and allows operation with good beam quality.

In the art, the thin disk is also known as an active mirror as it acts as a mirror with laser gain. Within the laser resonator, the thin disk may operate as an end mirror or as a folding mirror. When employed as a folding mirror, there results two double passes of the laser radiation per resonator round trip wherein the gain per round trip is effectively doubled and the threshold pump power is consequently reduced.

Although the thin disk's geometry is thermally advantageous, thin disk lasers are generally limited in pump diameter due to the onset of lateral lasing parasitics. The lateral lasing parasitics may reduce the stored energy in a Q-switched application or compete with the desired lasing process along the laser beam axis in continuous or long-pulse applications or implementations. Consequently, in a continuously operated laser resonator based on thin disk gain elements, a high level of optical saturation must be maintained to avoid amplified spontaneous emission buildup. A low-loss, low-threshold resonator design is necessary. Such a resonator, however, typically fails to achieve high power with high beam quality.

At high power output, it is generally desirable to have a high outcoupling fraction to reduce the circulating intensity, mitigating damage and thermo-optical distortion of the intra-cavity resonator optics. Furthermore, resonators that support high beam quality typically introduce an optical loss for higher order modes either through aperturing, absorption or increased output coupling by round-trip magnification of the lasing mode (e.g., as in unstable resonators). As a result of each of these aspects, an undesirable increase in threshold gain occurs.

Apart from reducing non-saturable losses in the resonator, a low-threshold gain condition can only typically be achieved by longitudinally adding more gain length either through serially combining more disks or by multipassing disks. This is understood as prior attempts in adding thickness to the individual thin-disks degraded efficiency and thermo-optical performance. Unfortunately, both techniques necessitate an increase in the number of optical elements used in the resonator, and hence the total round-trip wavefront error which scales with the number of optical surfaces encountered, and generally degrades the beam quality of the laser. It is understood that marginally stable resonators and low magnification unstable resonators will not accommodate large wavefront errors and are relatively more sensitive to alignment errors. Without active, intra-cavity wavefront correction, near-perfect optical elements are first needed (including laser gain disks) to achieve diffraction-limited beam quality.

Passive intra-cavity wavefront correction is preferable to active control (i.e., adaptive or non-linear optical approaches) wherever possible, in part as it is simple, robust and low cost. However, active mirror approaches not only typically require many degrees of freedom to properly correct a disk-laser system, but must include magnification/demagnification elements (MDEs). Current deformable mirror (DM) technologies are recognized to be unable to operate at the power density encountered at the unexpanded disk size with more than a few degrees of freedom. Even allowing for increased actuator density from a new technology, a new DM would need actuators largely immune to thermal effects to be useable at unity magnification. Similarly, nonlinear elements, while potentially useful, currently exhibit losses too great to be efficient used intra-cavity.

Therefore, what is needed is a multipassing architecture which allows low threshold gain and low intra-cavity intensity to be reasonably achieved while benefiting from structural symmetries to cancel disk aberrations and reduce wavefront error buildup.

SUMMARY OF THE INVENTION

The present embodiment addresses such a need as it comprises a multipass architecture which enables a low saturated gain level to be achieved, while using structural symmetries to cancel disk aberrations and reduce wavefront error buildup.

The present embodiment is a method and device having an intra-cavity reflector assembly employing pairs of dielectric reflecting mirrors to multipass the gain generator of a thin-disk laser, while reducing reflected wavefront error and producing polarized laser output.

In one implementation, the present embodiment is an assembly for a laser for reducing wave front error in a laser, comprising: a thin-disk gain generator; and one or more pairs of fold mirrors whereby each fold mirror pair is arranged along a re-entrant optical path in a predetermined configuration having generally reflectively cooperative pathways.

In another implementation, the present embodiment is a solid-state laser having a reduced wave front error, comprising: a solid-state laser; a thin-disk gain generator; and a pair of fold mirrors configurably angled in relation to one another at a reflective angle, whereby each fold mirror pair is arranged along a re-entrant optical path towards the thin-disk gain generator in a predetermined configuration having generally reflectively cooperative pathways for beams.

In a further implementation, the present embodiment is a solid-state device having an intra-cavity reflector assembly for reducing wave front error, comprising: a rotatable gain generator; and a pair of dielectric reflecting mirrors arranged in relation to one another to provide a reflective angle of approximately 90 degrees to multipass the gain generator.

In a further implementation, the present embodiment is a method for reducing wave front error in a laser while promoting a generally linear polarized output beam, comprising: providing an intra-cavity assembly, arranging said assembly into a laser, and providing conditioning gas longitudinally for conditioning of a beam.

In a further implementation, the present embodiment is a thin disk laser having the assembly set forth above.

The present embodiment effectively lowers the saturated gain level by multipassing each gain generator in a unique method to cancel some of the wavefront error contributions from the disk surfaces. Wavefront aberrations introduced on one pass of the gain disk are canceled through symmetry on successive passes. The reduced wavefront error also significantly improves design space for single-mode resonators. Additionally, the present embodiment provides for a single polarization laser operation.

The features, functions, and advantages can be achieved independently in various embodiments of the present invention or may be combined in yet other embodiments.

DETAILED DESCRIPTION

The following description is presented to enable one of ordinary skill in the art to make and use the embodiment and is provided in the context of a patent application and its requirements. Various modifications to the implementations and the generic principles and features described herein will be readily apparent to those skilled in the art. Thus, the present embodiment is not intended to be limited to the implementations shown, but is to be accorded the widest scope consistent with the principles and features described herein.

In one implementation of the present embodiment, an intra-cavity reflector assembly employing pairs of dielectric reflecting mirrors to multipass the gain generator of a thin-disk laser while making use of symmetry to reduce reflected wavefront error, and producing polarized laser output is provided. Additionally, in a further aspect, in an implementation of the present embodiment, the gain disk may be rotated so that the fold plane-of-symmetry reverses the largest wavefront error.

In operation, in an implementation, pairs of fold mirrors are included which create a re-entrant optical path to (i.e., towards) the thin-disk gain generators (i.e., gain disks) which produces "V"-shaped beam lines that are indexed azimuthally about the disk normal. The azimuthal angle determines lines of symmetry in the wavefront at the thin-disk between the first and successive reflections from the disk.

Figure 1:
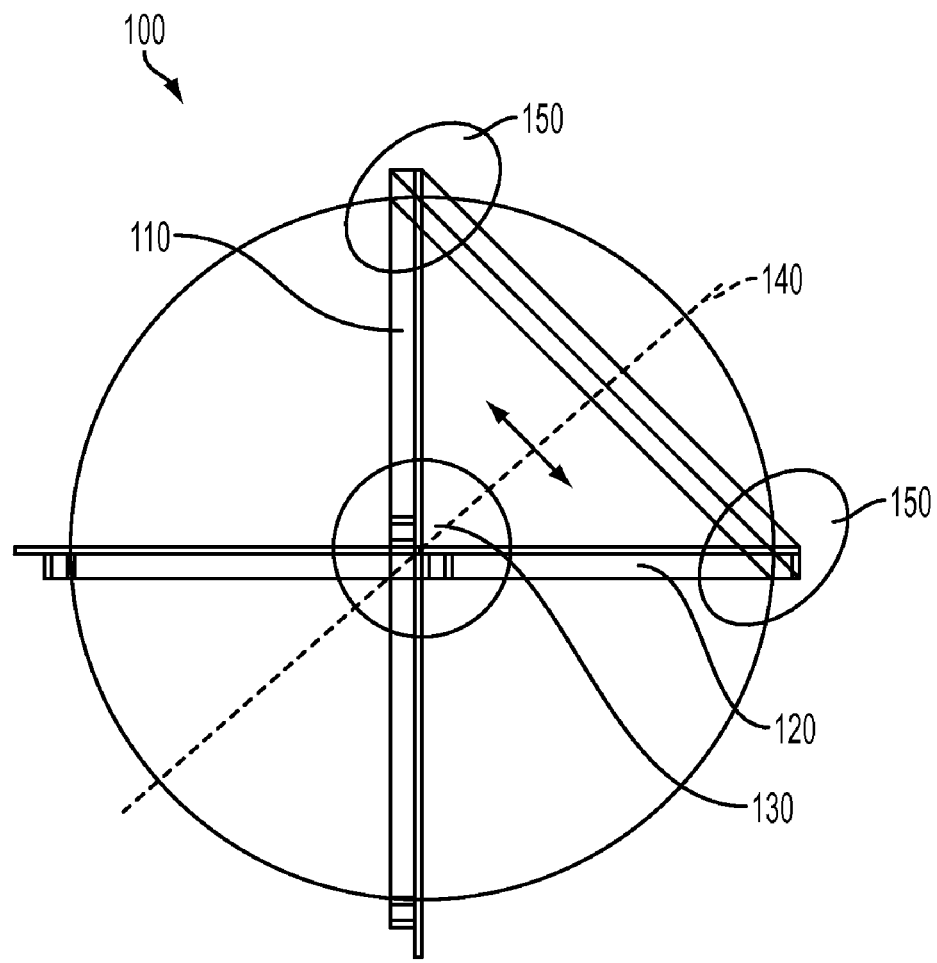
FIG. 1 depicts a Double V beam path of the present embodiment.

FIG. 1 depicts a Double V beam path of the present embodiment. In this implementation, for a double pass 100 is provided, where the two V-shaped path's (i.e., Double V or DV), 110 and 120 respectively, may be oriented at 90 degrees, at 130, in relation to one another. The resulting line of flip symmetry (140) may bisect the azimuthal angle between the fold mirrors (150). Any disk surface error having odd symmetry about this line may cancel between passes (e.g., y astigmatism, x coma, x trefoil, y tetrafoil about the y axis). This criterion is intended to include but not be limited to Zernike aberrations of any order except those of spherical aberration. The azimuthal angle of the disk can be rotated about the disk normal to orient the worst aberration(s) to this line of symmetry.

Figure 2A:
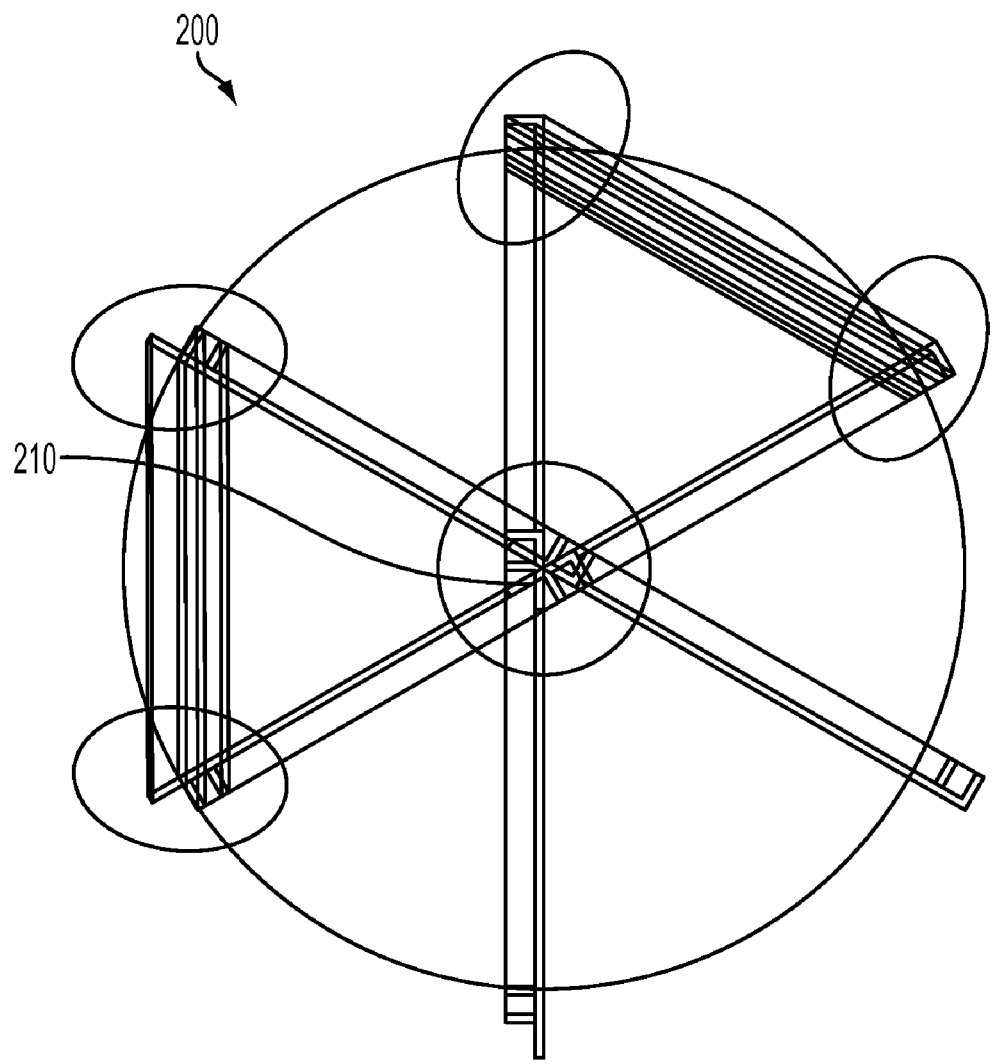
FIG. 2A depicts a triple V beam path with hexagonal symmetry of the present embodiment.
Figure 2B:
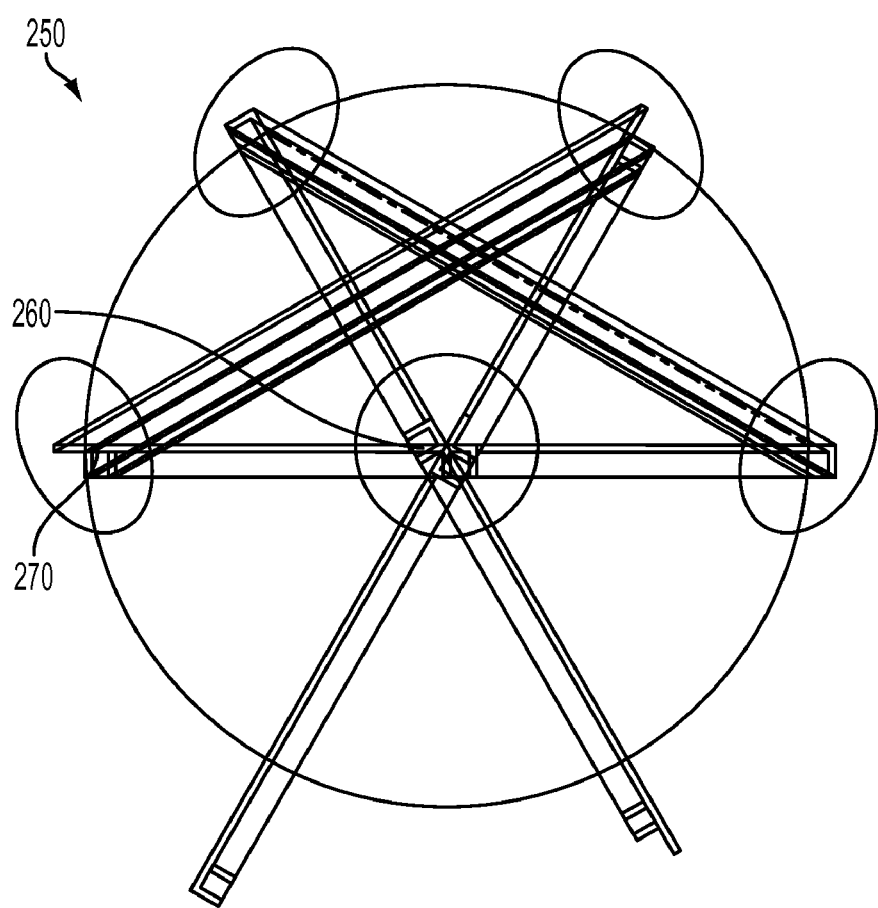
FIG. 2B depicts a triple V beam path in a different layout configuration of the present embodiment.

FIG. 2A depicts a triple V beam path 200 with hexagonal symmetry in an implementation. Three and higher-pass geometries, like those shown in FIG. 2A, can be used to cancel higher-order aberrations. In FIG. 2A, three beam crossings may occur at 210. FIG. 2B depicts a triple V beam path 250 in a different layout configuration. In FIG. 2B, three beam crossings may occur at 260 and an example V arrangement may be located at 270. The number of passes may be physically limited by the dimensions of the beam and reflectors. Similarly, multiple V beam path combinations may be provided in view of available physical size and limitations.

Figure 3:
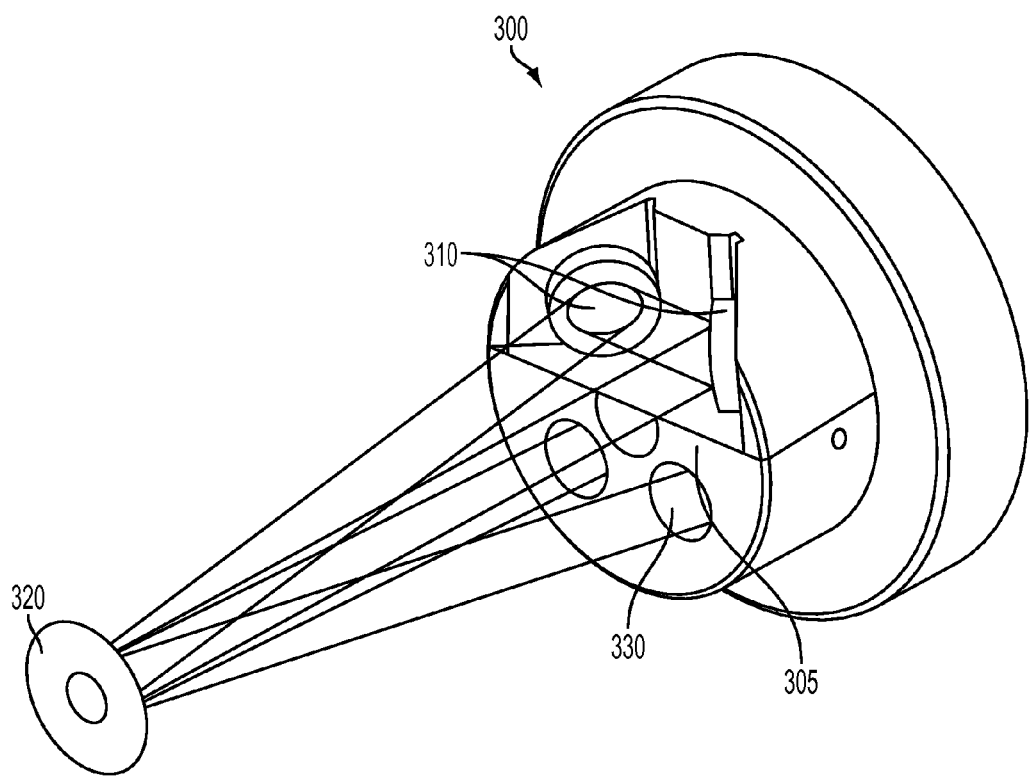
FIG. 3 depicts a Double-V assembly of the present embodiment.

FIG. 3 depicts a Double-V assembly 300. In FIG. 3, a DV mount is depicted at 305 and a pair of dielectric-coated fold mirrors 310 are shown as positioned in relation to the disk 320 and a beam opening at 330.

Figure 4:
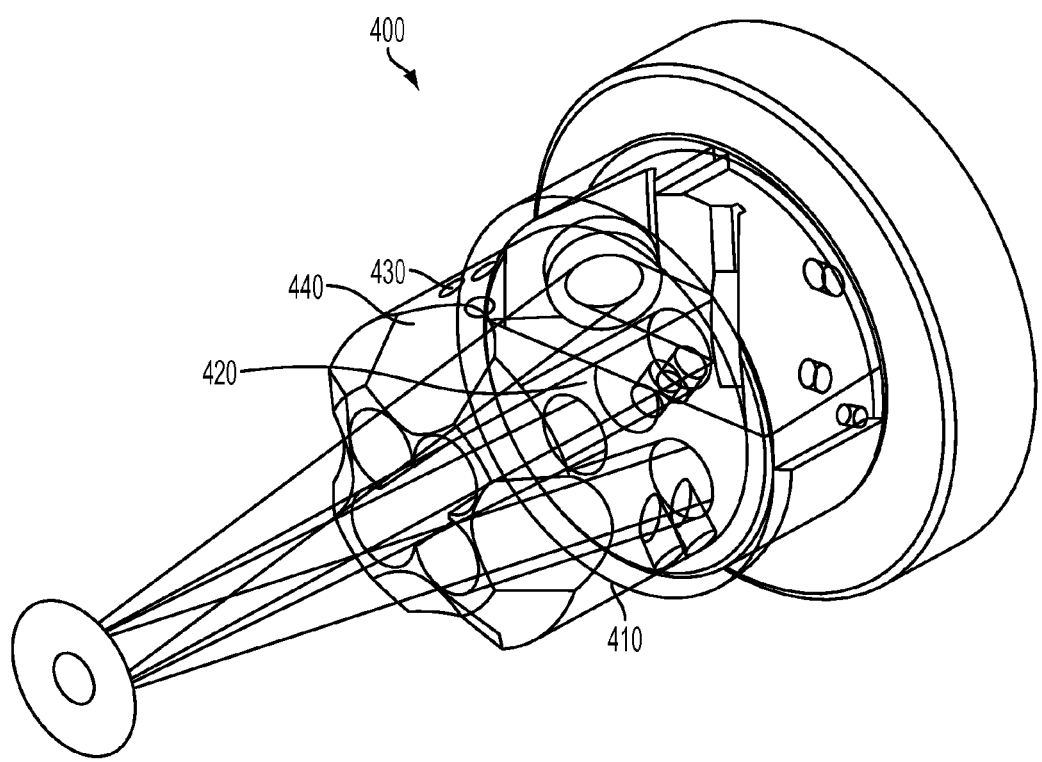
FIG. 4 depicts a Double-V assembly with a beam-path conditioning head of the present embodiment.

FIG. 4 depicts a Double-V (DV) assembly 400 with a beam-path conditioning head 440. The beam path 420 within the DV assembly, in an implementation, may be conditioned with a longitudinal flow of clean, dry air at 430. Air flow may be confined by beam tubes cut into the DV fixture and into beam-path conditioning (BPC) head 440, as shown in FIG. 4. Alternative methods (e.g., substituting for air: inert gas purge, vacuum, etc.) could also be used with the DV architecture. The physical size of the DV, and hence the round-trip optical path length between reflections from the disk may be determined largely by the method of BPC employed. Also depicted is the DV mount at 410.

Figure 5:
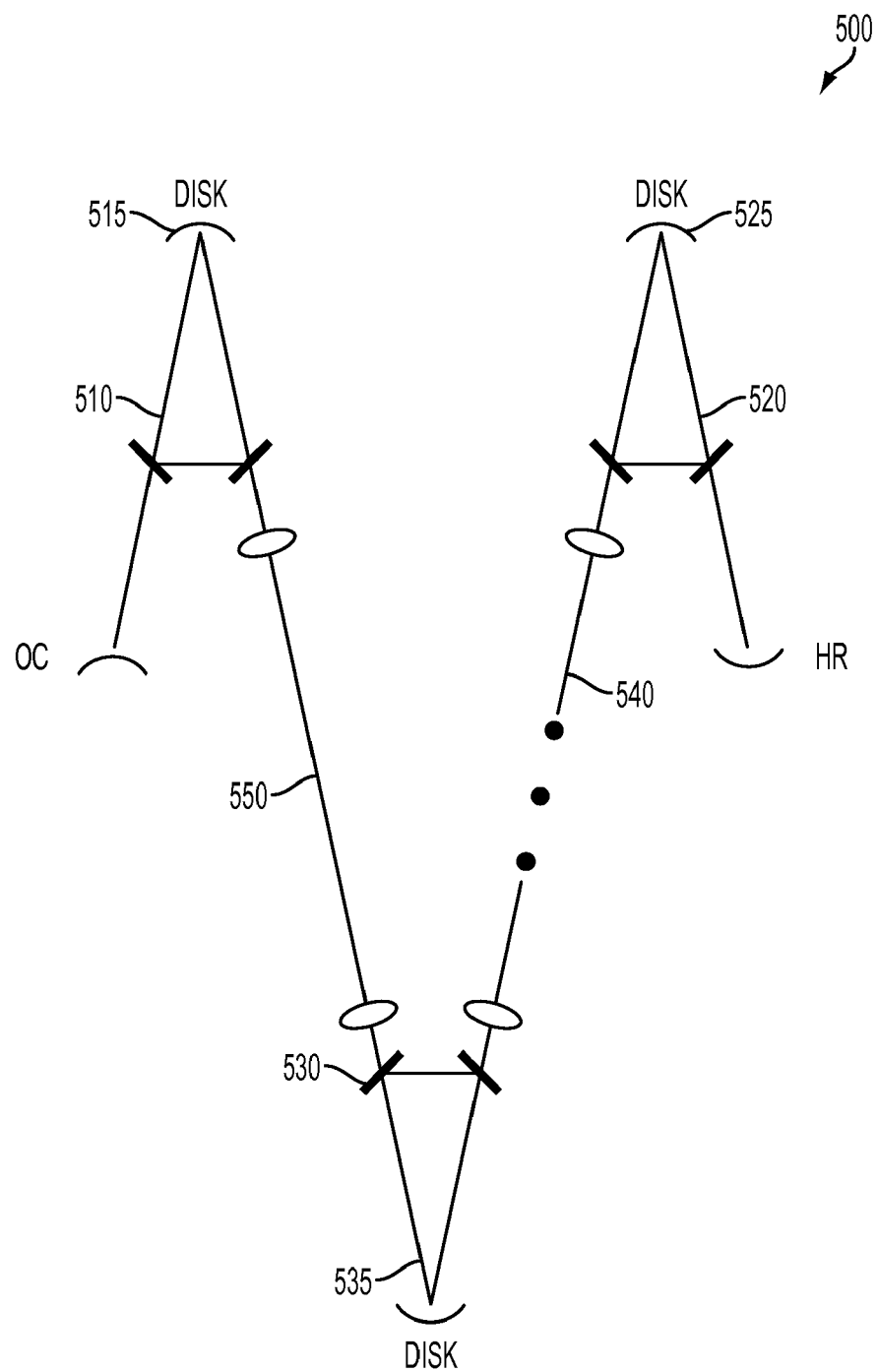
FIG. 5 depicts a typical resonator layout using Double-V assemblies with each gain disk of the present embodiment.

FIG. 5 depicts a typical resonator layout 500 using Double-V assemblies 510, 520, 530 with each gain disk. The resonator may utilize a DV assembly 510, 520, 530 for each disk 515, 525, 535 and real relay imaging between disks 540, 550 to maintain an adequately high Fresnel number. A larger number of disks can be incorporated into the resonator for power scaling by repeating the pattern where the "dots" on the Figure indicate.

Figure 6:
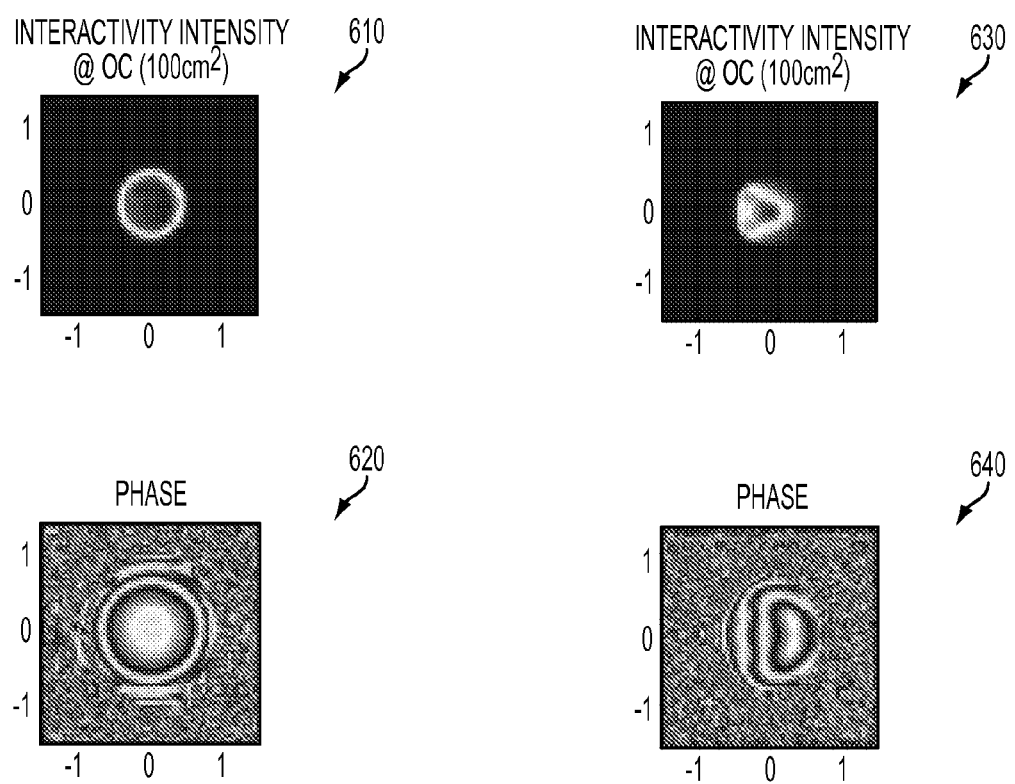
FIG. 6 depicts wave-optics simulation of a resonator with and without Double-V wavefront cancellation of the present embodiment.

A wave-optics simulation of a four disk, Yb:YAG unstable resonator is set forth in FIG. 6, where Zernike aberrations (up to term 24) with odd symmetry about the DV flip-line were introduced for each disk surface. The total RMS error on a round-trip was 0.03 waves at 1 µm, and the magnification of the resonator was approximately 1.25×. With the disk rotated optimally, at 610 and 620, it is apparent that the aberrations cancel exactly, leaving a uniform intensity and phase profile intra-cavity. Without the DV symmetry, however, the intra-cavity mode builds up intensity and phase distortions that scale with the amplitude of the aberrations as is apparent in 630 and 640.

In an implementation, the angle of incidence (AOI) for DV fold mirrors may be less than 50 degree and greater than 30 degrees. In a further implementation, an AOI of 42 degrees may be used. Standard multilayer high-reflectance (HR) coatings typically may have a small difference in reflectance between the polarizations (i.e., 99.9% p-polarization versus 99.99% for s-polarization) at large angles, and a small differential phase shift. With the designed DV geometry of the present embodiment, the difference in reflectance is large enough to promote a linearly polarized output beam in a resonator, provided thermal stress-birefringence in the disk is low. Therefore, the present embodiment also provides for polarization beam-combining of two lasers.

Figure 7:
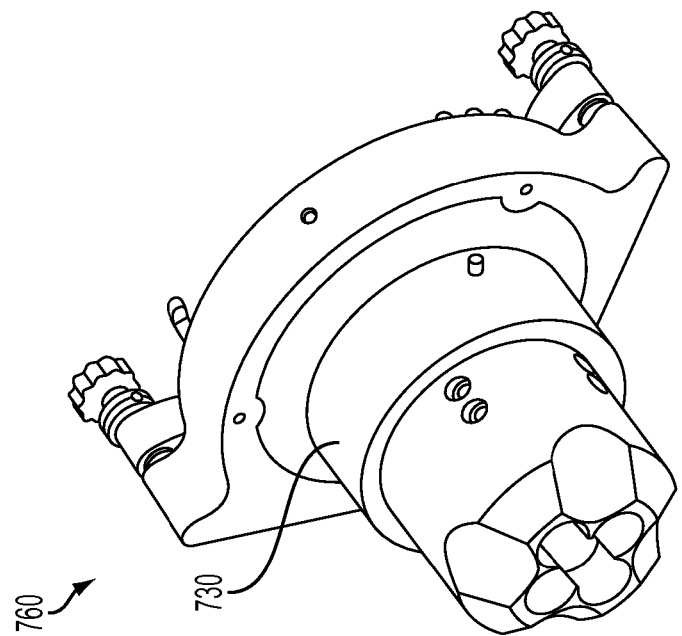
FIG. 7 depicts a Double-V prototype assembly of the present embodiment in an implementation which has been tested.
Figure 7:
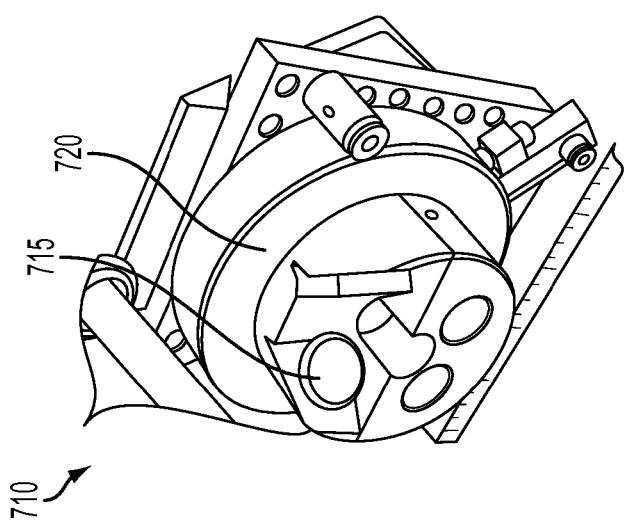

FIG. 7 depicts a Double-V assembly 710, 750 which has been tested. The tested assembly included high surface quality mirrors 715 with very high reflectance and low-loss dielectric coatings which were attached to the DV fixture 720, 760 using a low shear stress adhesive, although mechanical means may also be employed to locate the reflectors.

Figure 8:
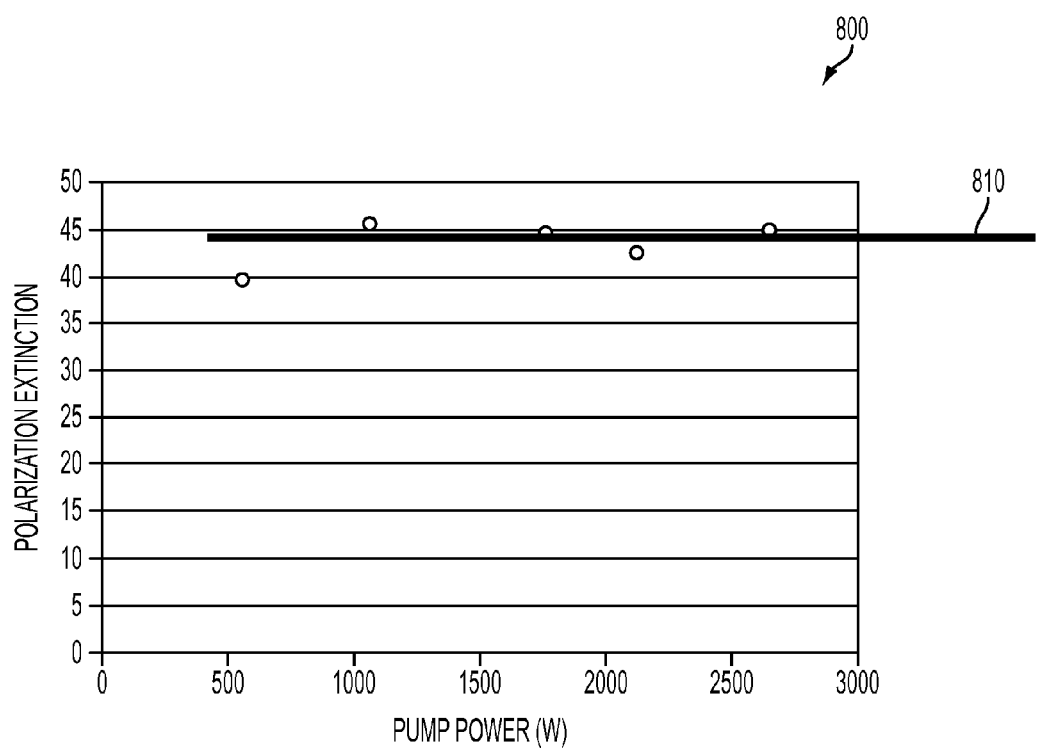
FIG. 8 depicts polarization extinction of the laser output versus pump power of the present embodiment.

FIG. 8 depicts polarization extinction of the laser output versus pump power 800 for the present embodiment in an implementation. As is apparent in FIG. 8, polarization extinction is generally high and independent of pump power along 810.

Figure 9:
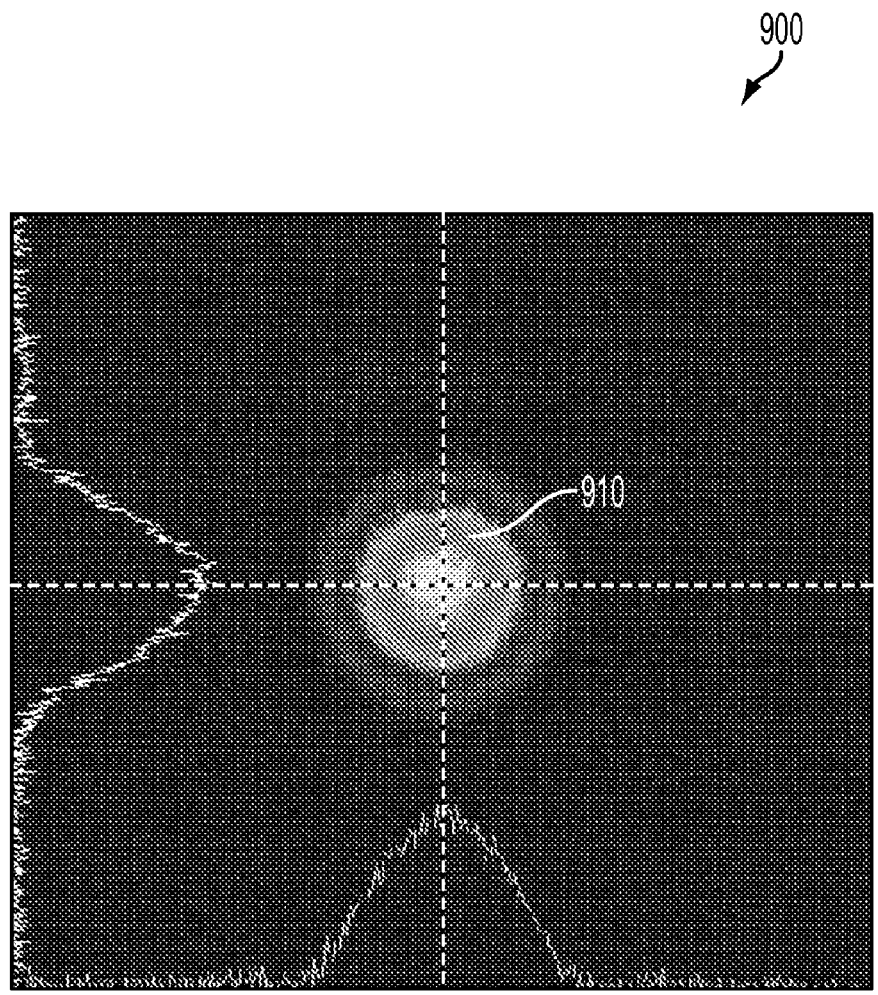
FIG. 9 shows a focused spot with azimuthal angle of surrogate disk set to cancel astigmatism of the present embodiment.

Similarly, the wavefront cancellation properties of the DV assembly discussed previously were independently tested by introducing a collimated 1 μm wavelength beam into the device with a surrogate laser disk located in the correct plane. The "disk" was a thin HR coated optic with approximately 1 wave PV of astigmatism and a radius of curvature of about 20 m concave. Other aberrations were present in smaller amplitudes. Due to the optic's focus and astigmatism, the beam came to x and y foci at different planes after the DV. By rotating the azimuthal angle of the surrogate disk such that the astigmatism was predominantly Zernike y-astig relative to DV, the astigmatism was removed and a focused spot resulted as is shown in FIG. 9. FIG. 9 shows a focused spot at 910 with azimuthal angle of surrogate disk set to cancel astigmatism of the present embodiment.

The present embodiment has a variety of uses in a diversity of fields including those of: a technology enabler at the weapon-class of solid state technology; provision for high reliability, high efficiency solid state lasers in the weapon-power class; weapons-class laser devices; and related solid-state devices and assemblies.

The present embodiment provide significant benefits to the field including those of double passing a disk in a compact fashion, and the ability to cancel aberrations on the disks in many instances. Additionally, the present embodiment may be implemented with minimal impact to any thin disk laser assembly to the overall resonator layout.

While there are many structural and functional equivalents to the elements of the present embodiment, it is understood that those equivalents, technological improvements and functional equivalents, alone or in combination, are intended to be included in the description herein without exception.

Although the present embodiment has been described in accordance with the implementations shown, one of ordinary skill in the art will readily recognize that there could be variations to the implementations and those variations would be within the spirit and scope of the present embodiment. Accordingly, many modifications may be made by one of ordinary skill in the art without departing from the spirit and scope of the appended claims.

What is claimed is:

1. An intra-cavity assembly for a laser for reducing wave front error of a laser, comprising:
   a thin-disk gain generator, wherein the thin-disk gain generator is optimally rotated such that fold plane-of-symmetry reverses a largest wave front error and thereby cancels wave front error contributions from the surface of thin-disks; and
   one or more pairs of dielectric reflecting fold mirrors arranged such that an optical path is provided such that each mirror within a pair is at a reflective angle with each other
   wherein each fold mirror pair is arranged along a re-entrant optical path in a predetermined configuration having generally reflectively cooperative pathways and has an angle of incidence (AOI).

2. The assembly of claim 1 wherein the optical path is directionally towards the thin-disk gain generator and the reflective cooperative pathways are generally configured in a "V" shape.

3. The assembly of claim 2 wherein the cooperative pathways are configured for beams indexed azimuthally about the disk normal.

4. The assembly of claim 3, wherein an azimuthal angle determining a line of symmetry in a beam wavefront at the thin-disk in an operative assembly is determinable as between a first reflection and a selected reflection, from the disk, wherein said selected reflection is a successor to said first angle.

5. The assembly of claim 1, wherein said azimuthal angle between the V reflections is approximately 90 degrees and the AOI on the fold mirrors is between 30 and 50 degrees.

6. The assembly of claim 4, further comprising a conditioning pathway for providing a gas longitudinally for conditioning of a beam, and wherein said mirror pair includes a high-reflectance, low-loss dielectric coating.

7. The assembly of claim 6, wherein said gas is one of clean, dry air, humid air, inert gas, or a combination thereof.

8. The assembly of claim 7, wherein said assembly is arranged for intra-cavity placement in a solid-state laser device, said azimuthal angle is approximately 90 degrees and the AOI on the fold mirrors is approximately in the range of 40 to 45 degrees.

9. A solid-state laser having a reduced wave front error, comprising:
   a thin-disk gain generator, wherein the thin-disk gain generator is optimally rotated such that fold plane-of-symmetry reverses a largest wave front error and thereby cancels wave front error contributions from the surface of thin disks; and
   a pair of dielectric reflective fold mirrors configurably angled in relation to one another at a reflective angle and having an angle of incidence (AOI), wherein the fold mirror pair is arranged such that an optical path is provided such that each mirror within a pair is at a reflective angle with each other, wherein each fold mirror pair is arranged along a re-entrant optical path towards the thin-disk gain generator in a predetermined configuration having generally reflectively cooperative pathways for beams.

10. The laser of claim 9, wherein said reflective angle is in the range of approximately 30 to 50 degrees.

11. The laser of claim 9, wherein the optical path is directionally towards the thin-disk gain generator and the reflective cooperative pathways are generally configured in a "V" shape.

12. The laser of claim 11, wherein the pair of fold mirrors are configured such that the predetermined angle between an operative first beam V reflective path and an operative successive beam V reflective path is about 90 degrees.

13. The laser of claim 12, further comprising a conditioning pathway for providing a gas longitudinally for conditioning of a beam, and wherein said mirror pair includes a high-reflectance, low-loss dielectric coating.

14. The laser of claim 13, wherein said gas is one of clean, dry air, humid air, inert gas, or a combination thereof.

15. The laser of claim 14, wherein said azimuthal angle between the V reflections is approximately 90 degrees and the AOI is approximately in the range of 40 to 45 degrees.

16. A device having an assembly for reducing wave front error, comprising:
   a beam transmitter;
   one or more rotatable thin-disk gain generators; and
   one or more pairs of dielectric reflective fold mirrors arranged in relation to one another to provide multiple reflections from the thin-disk gain generator at a relative reflective angle of approximately 90 degrees and having an angle of incidence (AOI), wherein each fold mirror pair is arranged such that an optical path is provided such that each mirror within a pair is at a reflective angle with each other, wherein each fold mirror pair is situated along a re-entrant optical path directionally facing the thin-disk gain generator having generally reflectively cooperative pathways for beams, wherein the thin-disk generator is optimally rotated such that fold plane-of-symmetry reverses a largest wave front error and thereby cancels wave front error contributions from the surface of thin-discs.

17. The device of claim 16, wherein the reflective cooperative pathways are generally configured in a "V" shape.

18. The device of claim 17, wherein said beam transmitter is an optical oscillator.

19. The device of claim 17, wherein said beam transmitter is a light amplification device.

20. The device of claim 17, wherein said device is a laser.

21. The device of claim 20, further comprising a conditioning pathway for providing a gas longitudinally for conditioning of a beam, and wherein said mirror pair includes a high-reflectance, low-loss dielectric coating.

22. The device of claim 21, wherein said gas is one of clean, dry air, humid air, inert gas, or a combination thereof.

23. The device of claim 22 wherein said AOI for the fold mirrors is approximately in the range of 40 to 45 degrees.

24. A solid-state device having an intra-cavity reflector assembly for reducing wave front error, comprising:
a rotatable gain generator; and
a pair of dielectric reflecting mirrors arranged in relation to one another to provide a relative reflective angle of approximately 90 degrees to multipass the gain generator, wherein each fold mirror pair is arranged such that an optical path is provided such that each mirror within a pair is at a reflective angle with each other, wherein the gain generator is optimally rotated such that fold plane-of-symmetry reverses a largest wave front error and thereby cancels wave front error contributions from the surface of thin-disks.

25. The device of claim 24 wherein the device is a thin disk laser.

26. The device of claim 24, wherein the mirror pair is situated along a re-entrant optical path directionally facing the gain generator having generally reflectively cooperative pathways for beams, whereby the gain disk is rotated to a predetermined position where a fold plane-of-symmetry reverses a wavefront error.

27. The device of claim 26, wherein the device is capable of producing a polarized laser output.

28. The device of claim 27, further comprising a conditioning pathway for providing a gas longitudinally for conditioning of a beam, and wherein said mirror pair includes a high-reflectance, low-loss dielectric coating.

29. A method for reducing wave front error in a laser having at least one pair of dielectric reflective fold mirrors and at least one thin-disk gain generator, wherein each fold mirror pair is arranged such that an optical path is provided such that each mirror within a pair is at a reflective angle with each other, wherein the thin-disk gain generator is optimally rotated such that fold plane-of-symmetry reverses a largest wave front error and thereby cancels wave front error contributions from the surface of thin-disks, the method comprising:
arranging the pair of fold mirrors along a re-entrant optical path in a predetermined "V-shaped" configuration having generally reflective cooperative pathways towards the thin-disk gain generator,
arranging the pair of fold mirrors additionally to have an angle of incidence (AOI) in the range of 30 to 50 degrees, and
arranging a conditioning pathway for providing a gas longitudinally for conditioning of a beam.

30. The method of claim 29, wherein the cooperative pathways are configured for beams indexed azimuthally about the disk normal, and wherein an azimuthal angle determining a line of symmetry in a beam wavefront at the thin-disk is determinable as between a first reflection and a selected reflection, from the disk, wherein said selected reflection is a successor to said first angle.

31. The method of claim 29, wherein said mirror pair includes a high-reflectance, low-loss dielectric coating.

32. The method of claim 31, wherein said mirror pair is a plurality of mirror pairs.

33. The method of claim 31, wherein said disk is a plurality of disks.

34. The method of claim 31, wherein said mirror pair is a plurality of mirror pairs, said disk is a plurality of disks, and said gas is one of clean, dry air, humid air, inert gas, or a combination thereof.

35. The method of claim 34, wherein one more AOIs for the fold mirrors are in the range of 30 to 50 degrees.

36. A method for reducing wave front error in a laser while promoting a generally linear polarized output beam, comprising:
providing an intra-cavity assembly having
one or more rotatable thin-disk gain generators, wherein the thin-disk generator is optimally rotated such that fold plane-of-symmetry reverses a largest wave front error and thereby cancels wave front error contributions from the surface of thin-disks,
one or more pairs of dielectric reflective fold mirrors arranged in relation to one another to provide a reflective angle of approximately 90 degrees, having a general "V-shape," and having an angle of incidence (AOI), wherein each fold mirror pair is arranged such that an optical path is provided such that each mirror within a pair is at a reflective angle with each other, and
one or more conditioning pathways for providing a gas longitudinally for conditioning of a beam,
whereby each fold mirror pair is situated along a re-entrant optical path directionally facing the thin-disk gain generator having generally reflectively cooperative pathways for beams,
arranging said assembly into a laser, and
providing conditioning gas longitudinally for conditioning of a beam.

37. The method of claim 36 wherein said laser is a solid-state laser.

38. The method of claim 36, wherein the cooperative pathways are configured for beams indexed azimuthally about the disk normal, and wherein an azimuthal angle determining a line of symmetry in a beam wavefront at the thin-disk is determinable as between a first reflection and a selected reflection, from the disk, wherein said selected reflection is a successor to said first angle.

39. The method of claim 36, wherein said AOI for the fold mirrors is in the range of approximately 30 to 50 degrees.

40. The method of claim 39, further comprising rotating the azimuthal angle of the disk in a predetermined manner to affect an astigmatism.

* * * * *